(12) United States Patent
Cihula

(10) Patent No.: US 7,013,387 B2
(45) Date of Patent: Mar. 14, 2006

(54) SYSTEM FOR INCREASING REALIZED SECURE SOCKETS LAYER ENCRYPTION AND DECRYPTION CONNECTIONS

(75) Inventor: Joseph F Cihula, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 948 days.

(21) Appl. No.: 09/892,671

(22) Filed: Jun. 27, 2001

(65) Prior Publication Data

US 2003/0005281 A1 Jan. 2, 2003

(51) Int. Cl.
H04L 9/00 (2006.01)

(52) U.S. Cl. ...................................... 713/153; 709/232

(58) Field of Classification Search ................. 713/152, 713/201, 151, 153; 709/232

See application file for complete search history.

(56) References Cited

U.S. PATENT DOCUMENTS 6,681,327 B1 * 1/2004 Jardin ........................ 713/153

* cited by examiner

Primary Examiner—Gregory Morse
Assistant Examiner—Ellen C Tran
(74) Attorney, Agent, or Firm—Michael R. Barre

(57) ABSTRACT

A system for increasing realized secure sockets layer ("SSL") encryption and decryption connections is disclosed. The system combines monitoring of server load with adjustment of static SSL parameters to optimize a system of devices. The system monitors parameters of the servers that affect the ability of the servers to process SSL connections. An "SSL capacity" value for each server is calculated which represents the capability of that server to process SSL connections. This value is used to calculate an SSL threshold for that server, which is then applied to the SSL device to determine how many SSL connections the SSL device should process for that server. Since the connection threshold for an SSL device is a function of the device's load and each server's SSL capacity, and these values are dynamic, the connection threshold values are recalculated periodically to ensure increased SSL performance without impact to client response.

26 Claims, 2 Drawing Sheets

SYSTEM FOR INCREASING REALIZED SECURE SOCKETS LAYER ENCRYPTION AND DECRYPTION CONNECTIONS

BACKGROUND

1. Field of the Invention

Embodiments described herein are directed to a system for increasing realized secure sockets layer ("SSL") encryption and decryption connections without significant impact to client response. The system combines monitoring of server load with dynamic adjustment of static SSL parameters to optimize an entire system of devices.

2. Related Art

Secure Sockets Layer ("SSL") is a protocol for transmitting private documents in a public data communication network. SSL operates by using a key to encrypt data that is transferred over an SSL connection. The SSL protocol typically uses Transmission Control Protocol/Internet Protocol ("TCP/IP") and allows the following: 1) an SSL-enabled server to authenticate itself to an SSL-enabled client; 2) the client to authenticate itself to the server; and 3) both machines to establish an encrypted connection. An encrypted SSL connection requires the encryption by the sending software, and the decryption by the receiving software, of all information sent between a server and a client, thereby providing a high degree of confidentiality. Confidentiality is important for both parties to any private transaction. In addition, all data sent over an encrypted SSL connection is protected with a mechanism for detecting tampering—that is, for automatically determining whether the data has been altered from the point of transmission from the sending software until the data is received by the receiving software.

In current systems, SSL encryption and decryption devices ("SSL devices") operate independently of the servers upon which they are performing the SSL operations. That is, they do not use information from the servers to determine loading of the device that is performing the SSL encryption and decryption. Load refers to the amount of data, i.e., traffic that the device carries. Parameters for configuring the SSL performance are static, if existent at all. When thresholds for the number of connections that an SSL device will accept are available, they are static because they are the only information available to the device. Without information about server loading, the SSL device cannot make dynamic choices or decisions. The SSL device can, for example, determine when it can no longer sustain more connections. The SSL device is unable, however, to determine which server can sustain the same. The result is that overall SSL performance of a system of servers and SSL devices, with the constraint of no significant client impact, is limited by the performance of the SSL device. This is because static algorithms that determine SSL offload to individual servers cannot meet a no significant-impact guarantee.

A system for increasing realized SSL encryption and decryption connections is thus designed to combine monitoring of server load with adjustment of SSL parameters to optimize the system of devices. The result of this dynamic system is increased SSL performance without significant impact to end-user response.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION

The following paragraphs describe a system for increasing realized secure sockets layer ("SSL") encryption and decryption connections. An embodiment of the present invention includes an SSL encryption and decryption device ("SSL device") that includes both hardware and software. The software contains the code that performs calculations and acts on the calculations.

Figure 1:
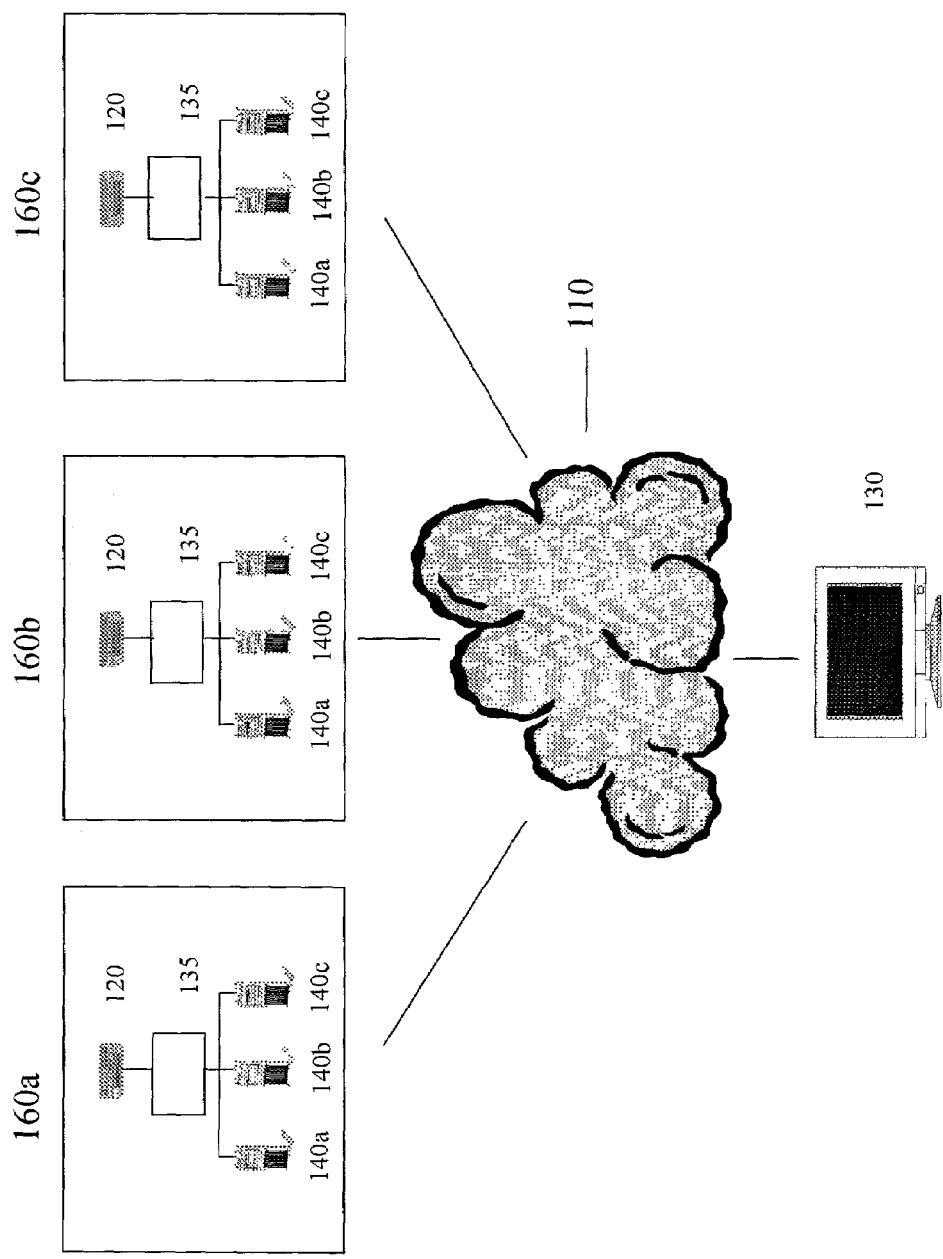
FIG. 1 is a depiction of network connectivity of one SSL device and three servers.

According to one embodiment of the present invention, as illustrated in FIG. 1, a system 160a includes one SSL device 120 located within a data communication network 110 between a set of three servers 140a–c and a client machine 130. Coupled to one side of the data communication network 110 is the client machine 130. Meanwhile, a switch 135 acts as an intermediary between the SSL device 120 and the servers 140a–c, whereby the switch 135 receives data from the SSL device 120 and then forwards the data to the servers 140a–c.

This system 160a is dynamically optimized within the data communication network 110.

The data communication network 110 may include the Internet, an Intranet, or any combination of public and private data communication networks. The data communication network 110 may be configured as a local-area network, wide-area network, or another kind of architecture. A multitude of systems, as depicted by 160b–c, may further be sustained within the data communication network 110.

The client machine 130 attempts to open SSL connections to the servers 140a–c. The SSL device 120 intercepts these connections, performs SSL encryption and decryption, and then sends the encrypted information to the appropriate server 140a–c in an unencrypted format. For example, if client machine 130 attempts to open an SSL connection to server 140a, the SSL device 120 intercepts the connection and opens it with client machine 130. The SSL device 120 then unencrypts the data sent over the connection and sends that data to server 140a, unencrypted.

The system combines the monitoring of server 140a–c load with dynamic adjustment of SSL device 120 parameters to optimize the entire system. The system, i.e. software running on some platform such as, but not limited to, an SSL device or a server, monitors certain parameters of the servers 140a–c such as, but not limited to, CPU utilization and available memory, that are known to affect the ability of the servers to process SSL connections.

The servers 140a–c may be monitored by many mechanisms. An agent, i.e., software, may be installed on the servers 140a–c that then communicates to the SSL device 120. Windows NT has a protocol for remote monitoring of many types of server statistics, including CPU usage. UNIX operating systems support the remote execution of programs that can provide this information. In addition, Simple Network Management Protocol ("SNMP") may also be used for monitoring.

Figure 2:
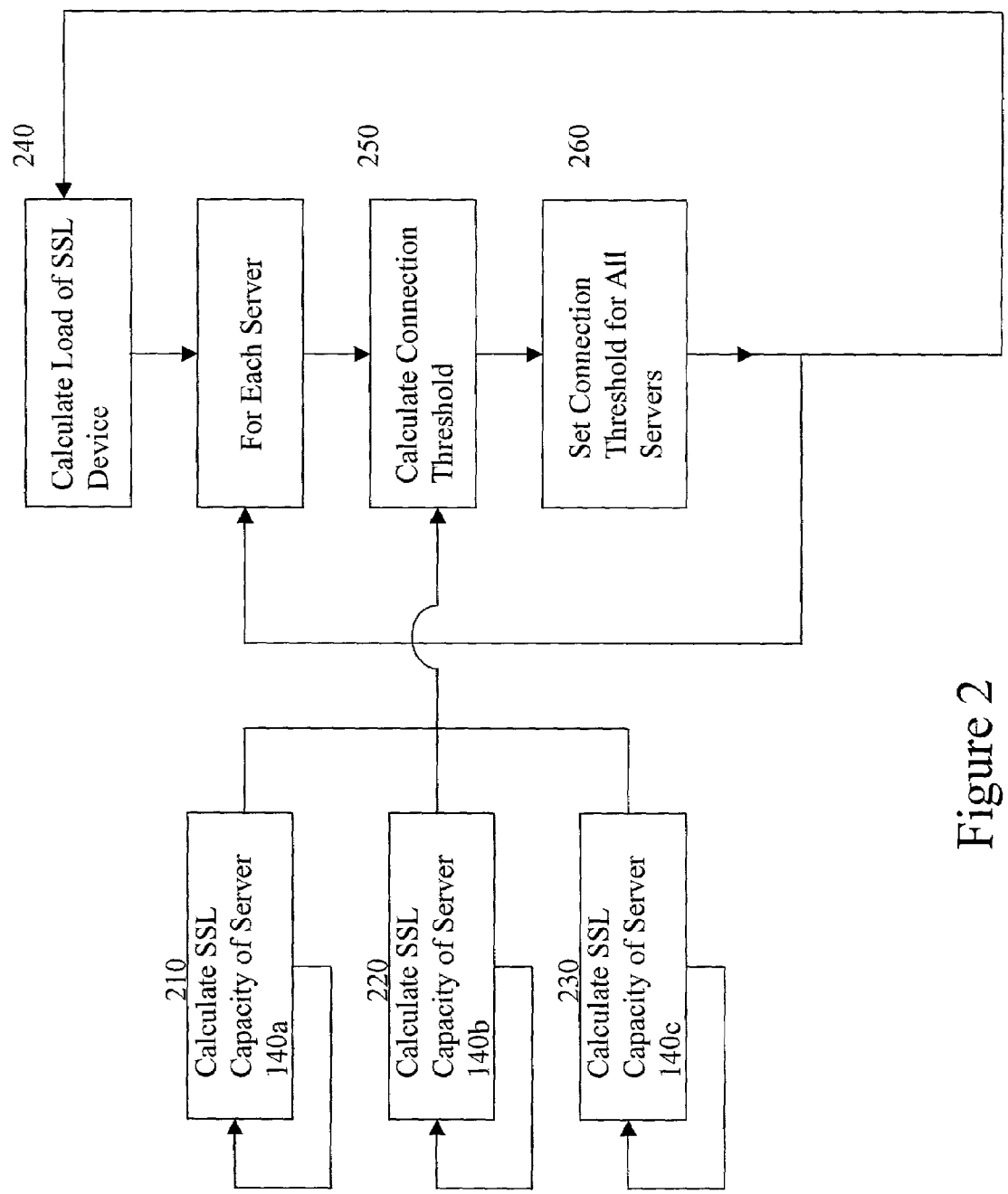
FIG. 2 is a flowchart illustrating the optimization process of a system of one SSL device and three servers.

As shown in FIG. 2, an "SSL capacity" value for each server 140a–c is calculated and represents the capacity of that server 140a–c to process SSL connections. This is illustrated in step 210 for server 140a, step 220 for server 140b, and step 230 for server 140c. The calculation may be a direct value or a computation of values. Various algorithms may be used to determine such a value. One such algorithm is capacity=max [(# processors×processor speed in MHz/100)×(0.7−CPU utilization), 0]. Since SSL acceleration hardware may be present in some systems, another possible algorithm is capacity=max [(# processors×processor speed in MHz/100)×(0.7−CPU utilization)+$f_n(x)$, 0], where $f_n(x)$ represents the SSL acceleration capabilities of the SSL acceleration hardware.

The greater the SSL capacity of the server 140a–c, the fewer SSL connections the SSL device 120 should process. The number of SSL connections processed by the SSL device 120 also depends on the load of the SSL device 120. Load is a direct value or computation such as, but not limited to, CPU utilization. Calculating the load of the SSL device 120 is shown in step 240. If an SSL device 120 is lightly loaded, it processes more SSL connections for all the servers 140a–c than if it is heavily loaded.

As illustrated in step 250, the SSL capacity value is then used to calculate an "SSL connection threshold" for that server 140a–c. This is applied to the SSL device 120 to determine how many SSL connections the SSL device 120 should process for that server 140a–c, as shown in step 260. One algorithm for this calculation is threshold=10×server capacity×device CPU utilization. This represents the number of SSL connections that the SSL device 120 would allow to be processed by a given server 140a–c.

Since the connection threshold for the SSL device 120 is a function of both the load of the SSL device 120 and the SSL capacity of each server 140a–c, and these values are dynamic, the connection threshold values are recalculated periodically. The recalculation is based either on time or on additional thresholds that are functions of the SSL capacity and/or SSL device load. The result of this dynamic system is increased SSL performance without significant impact to client response.

While the above description refers to particular embodiments of the present invention, it will be understood to those of ordinary skill in the art that modifications may be made without departing from the spirit thereof. The accompanying claims are intended to cover any such modifications as would fall within the true scope and spirit of the present invention.

The presently disclosed embodiments are therefore to be considered in all respects as illustrative and not restrictive; the scope of the invention being indicated by the appended claims, rather than the foregoing description. All changes that come within the meaning and range of equivalency of the claims are therefore intended to be embraced therein.

What is claimed is:

1. A method comprising:
monitoring at least one performance characteristic of a server that processes secure sockets layer (SSL) communications from clients, the monitored performance characteristic selected from the group consisting of CPU utilization and memory utilization;
dynamically calculating available capacity of the server to process SSL connections, based at least in part on the monitored performance characteristic of the server; and
based at least in part on the dynamically calculated available capacity of the server, automatically adjusting a configuration parameter of an SSL proxy device in communication with the server to modify how many SSL connections are to be processed by the SSL proxy device on behalf of the server.

2. A method according to claim 1, wherein:
the configuration parameter specifies a maximum number of SSL connection to be processed by the proxy device on behalf of the server.

3. A method according to claim 1, comprising:
automatically determining how many SSL connections the server can handle without being overloaded.

4. A method according to claim 1, comprising:
automatically determining how many SSL connections the server can handle without being overloaded; and
automatically modifying the number of SSL connections to be processed by the SSL proxy device on behalf of the server, based at least in part on the determination of how many SSL connections the server can handle without being overloaded.

5. A method according to claim 1, wherein SSL proxy device performs operations comprising:
decrypting a request received from a client via an SSL connection; and
forwarding the decrypted request to the server.

6. A method according to claim 1, further comprising:
automatically monitoring workload of the SSL proxy device; and
automatically modifying the maximum number of SSL connections to be processed by the SSL proxy device, based at least in part on:
the dynamically calculated available capacity of the server to process SSL connections; and
the workload of the SSL proxy device.

7. A method according to claim 1, wherein the operation of dynamically calculating available capacity of the server to process SSL connections comprises:
computing the available capacity of the server using a formula substantially in the form of:
max [(# processors×processor speed/100)×(0.7−CPU utilization), 0].

8. A method according to claim 1, wherein one or more of the operations are to be performed by the server.

9. A method according to claim 1, wherein one or more of the operations are to be performed by the SSL proxy device.

10. A machine-accessible medium having instructions which, when executed by a processing system, result in the performance of operations comprising:
monitoring at least one performance characteristic of a server that processes secure sockets layer (SSL) communications from clients, the monitored performance characteristic selected from the group consisting of CPU utilization and memory utilization;
dynamically calculating available capacity of the server to process SSL connections, based at least in part on the monitored performance characteristic of the server; and
based at least in part on the dynamically calculated available capacity of the server, automatically adjusting a configuration parameter of an SSL proxy device in communication with the server to modify how many SSL connections are to be processed by the SSL proxy device on behalf of the server.

11. A machine-accessible medium according to claim 9, wherein:
the configuration parameter specifies a maximum number of SSL connection to be processed by the proxy device on behalf of the server.

12. A machine-accessible medium according to claim 9, wherein the operations comprise:

automatically determining how many SSL connections the server can handle without being overloaded.

13. A machine-accessible medium according to claim 9, wherein the operations comprise:
automatically determining how many SSL connections the server can handle without being overloaded; and
automatically modifying the number of SSL connections to be processed by the SSL proxy device on behalf of the server, based at least in part on the determination of how many SSL connections the server can handle without being overloaded.

14. A machine-accessible medium according to claim 9, wherein the operations comprise:
automatically monitoring workload of the SSL proxy device; and
automatically modifying the maximum number of SSL connections to be processed by the SSL proxy device, based at least in part on:
the dynamically calculated available capacity of the server to process SSL connections; and
the workload of the SSL proxy device.

15. A machine-accessible medium according to claim 9, wherein the operation of dynamically calculating available capacity of the server to process SSL connections comprises:
computing the available capacity of the server using a formula substantially in the form of:
max [(# processors×processor speed/100)×(0.7−CPU utilization), 0].

16. A machine-accessible medium according to claim 9, wherein one or more of the instructions are to be executed on the server.

17. A machine-accessible medium according to claim 9, wherein one or more of the instructions are to be executed on the SSL proxy device.

18. A system comprising:
a processor;
a machine-accessible medium responsive to the processor; and
instructions in the machine-accessible medium, wherein the instructions, when executed, result in the performance of operations comprising:
monitoring at least one performance characteristic of a server that processes secure sockets layer (SSL) communications from clients, the monitored performance characteristic selected from the group consisting of CPU utilization and memory utilization;
dynamically calculating available capacity of the server to process SSL connections, based at least in part on the monitored performance characteristic of the server; and
based at least in part on the dynamically calculated available capacity of the server, automatically adjusting a configuration parameter of an SSL proxy device in communication with the server to modify how many SSL connections are to be processed by the SSL proxy device on behalf of the server.

19. A system according to claim 17, wherein the configuration parameter specifies a maximum number of SSL connection to be processed by the proxy device on behalf of the server.

20. A system according to claim 17, wherein the operations comprise:
automatically determining how many SSL connections the server can handle without being overloaded.

21. A system according to claim 17, wherein the operations comprise:
automatically determining how many SSL connections the server can handle without being overloaded; and
automatically modifying the number of SSL connections to be processed by the SSL proxy device on behalf of the server, based at least in part on the determination of how many SSL connections the server can handle without being overloaded.

22. A system according to claim 17, wherein SSL proxy device performs operations comprising:
decrypting a request received from a client via an SSL connection; and
forwarding the decrypted request to the server.

23. A system according to claim 17, wherein the operations comprise:
automatically monitoring workload of the SSL proxy device; and
automatically modifying the maximum number of SSL connections to be processed by the SSL proxy device, based at least in part on:
the dynamically calculated available capacity of the server to process SSL connections; and
the workload of the SSL proxy device.

24. A system according to claim 17, wherein the operation of dynamically calculating available capacity of the server to process SSL connections comprises:
computing the available capacity of the server using a formula substantially in the form of:
max [(# processors×processor speed/100)×(0.7−CPU utilization), 0].

25. A system according to claim 17, wherein:
the system comprises the server; and
the instructions execute at least partially on the server.

26. A system according to claim 17, wherein:
the system comprises the SSL proxy device; and
the instructions execute at least partially on the SSL proxy device.

* * * * *